US009249897B2

(12) United States Patent
Acosta

(10) Patent No.: US 9,249,897 B2
(45) Date of Patent: *Feb. 2, 2016

(54) DOUBLE ACTION FLOAT VALVE

(71) Applicant: Hugo Antonio Munoz Acosta, Chihuahua (MX)

(72) Inventor: Hugo Antonio Munoz Acosta, Chihuahua (MX)

( * ) Notice: Subject to any disclaimer, the term of this patent is extended or adjusted under 35 U.S.C. 154(b) by 25 days.

This patent is subject to a terminal disclaimer.

(21) Appl. No.: 14/319,974

(22) Filed: Jun. 30, 2014

(65) Prior Publication Data

US 2015/0083239 A1     Mar. 26, 2015

Related U.S. Application Data

(63) Continuation-in-part of application No. 14/035,672, filed on Sep. 24, 2013, now Pat. No. 8,763,629.

(60) Provisional application No. 61/798,996, filed on Mar. 15, 2013.

(51) Int. Cl.
    *F16K 31/20*     (2006.01)
    *F16K 31/22*     (2006.01)

(52) U.S. Cl.
CPC .................. *F16K 31/20* (2013.01); *F16K 31/22* (2013.01); *Y10T 137/7303* (2015.04); *Y10T 137/7319* (2015.04); *Y10T 137/7339* (2015.04); *Y10T 137/741* (2015.04); *Y10T 137/7404* (2015.04); *Y10T 137/7426* (2015.04)

(58) Field of Classification Search
CPC ... F16K 31/20; F16K 31/22; Y10T 137/7303; Y10T 137/7404; Y10T 137/7339; Y10T 137/7426; Y10T 137/7319; Y10T 137/741
See application file for complete search history.

(56) References Cited

U.S. PATENT DOCUMENTS

| | | | |
|---|---|---|---|
| 805,003 A | 11/1905 | Clarey | |
| 1,176,785 A | 3/1916 | Stielow | |
| 1,310,560 A * | 7/1919 | Cook | F16K 31/22 |
| | | | 119/73 |
| 1,340,999 A | 5/1920 | Wilson | |
| 1,704,501 A | 3/1929 | Force | |
| 2,155,400 A | 4/1939 | Caminiti | |
| 2,384,628 A | 9/1945 | Krone et al. | |
| 2,415,875 A * | 2/1947 | Greenwald | F16K 31/22 |
| | | | 137/433 |
| 2,715,414 A | 8/1955 | Kinzbach et al. | |

(Continued)

OTHER PUBLICATIONS

Krynski, William "Notification of Transmittal of the International Search Report and the Written Opinion of the International Searching Authority, or the Declaration," dated Nov. 4, 2014, Applicant Name: Hugo Antonio M Acosta, Applicant File Ref: P-10417.4; International Application No. PCT/US2014/029127; International Filing date Mar. 14, 2014.

*Primary Examiner* — Craig Schneider
*Assistant Examiner* — Patrick Williams
(74) *Attorney, Agent, or Firm* — John C. Cave; Gunn, Lee & Cave, P.C.

(57) ABSTRACT

The double action float valve is connected to a single pipe and a tank and controls both the filling and discharge of the tank. The double action float valve utilizes a valve body, a heavy filling obturator positioned within the valve body, a light inverse obturator positioned within the heavy filling obturator, and a float connected to the heavy filling obturator. When the inflow pressure from the pipe is greater than the outflow pressure of the tank, the tank is filled until the float reaches a predetermined level. When the outflow pressure of the tank is greater than the inflow pressure, the double action float valve is automatically reconfigured to discharge the fluid from the tank into the pipe.

12 Claims, 10 Drawing Sheets

(56) References Cited

U.S. PATENT DOCUMENTS

| | | |
|---|---|---|
| 2,716,422 A | 8/1955 | Whitlock, Jr. |
| 2,920,644 A * | 1/1960 | Schulze ............... F16K 31/18 |
| | | 137/391 |
| 2,935,081 A | 5/1960 | Kryzer |
| 3,005,465 A | 10/1961 | Whitlock et al. |
| 3,662,793 A | 5/1972 | Calisher et al. |
| 4,051,030 A | 9/1977 | Huiet, Jr. |
| 4,193,417 A | 3/1980 | Bowman |
| 4,735,226 A | 4/1988 | Szlaga |
| 4,905,726 A * | 3/1990 | Kasugai ........... B60K 15/03519 |
| | | 137/202 |
| 4,991,615 A | 2/1991 | Szlaga et al. |
| 5,365,970 A | 11/1994 | Butler |
| 6,296,016 B1 | 10/2001 | Parker et al. |
| 7,584,766 B2 | 9/2009 | David et al. |
| 2011/0186149 A1 | 8/2011 | Tagami et al. |

* cited by examiner

DOUBLE ACTION FLOAT VALVE

CROSS-REFERENCES TO RELATED APPLICATIONS

This continuation in part application claims the benefit of U.S. provisional application Ser. No. 61/798,996 filed Mar. 15, 2013 entitled Double Action Float Valve and U.S. patent application Ser. No. 14/035,672 entitled Double Action Float Valve, which are both incorporated by reference herein.

STATEMENT REGARDING FEDERALLY SPONSORED RESEARCH OR DEVELOPMENT

Not applicable.

BACKGROUND OF THE INVENTION

1. Field of the Invention

The present invention relates to the field of flow valves as used in the filling and discharge of fluid from a tank.

2. Description of the Related Art

There are several different kinds of float valves that are used to control the filling of tanks A basic float valve system is the direct-operated float valve. This system is installed in the upper part of a tank and when the tank is full the float pushes or pulls a piston resulting in the stoppage of flow into the tank. When the pressure is high, the float doesn't have enough power to stop the flow of fluid which results in leaks. To overcome this issue in larger tanks, more sophisticated float valves are utilized which results in higher cost.

There are other valves, such as pilot operated, that may be used in high pressures or with large diameter pipes. In this system, when the tank is full, the valve is closed using line pressure. These types of valves are complex and require multiple parts to ensure proper function.

The methods listed above require a pipe to fill the tank and an additional pipe to discharge liquid from the tank. This requires additional cost to construct, maintain, and increases the risk of problems occurring within the lines.

There is a need for a double action float valve that can work on a single line for both inflow and outflow as well as in high pressure applications.

SUMMARY OF THE INVENTION

The objective of the double action float valve is to supply a new valve that is superior to the current float valves on the market. The primary advantage to the double action float valve is the ability to operate through a single inflow and outflow pipe.

The double action float valve utilizes a valve body mounted in a tank. The valve body is connected to an inflow/outflow pipe that is connected to a liquid supply. A heavy filling obturator and a light inverse float obturator are located within the valve body. The heavy filling obturator is connected to a float that is positioned outside the valve body and within the tank. When the pressure of liquid from the inflow/outflow pipe is greater than the pressure from the tank, as measured at the outlet of the valve body into the tank, liquid enters the valve body, passes through ports in the first obturator, through the interior of the valve body and into the tank. Once the float reaches a predetermined level in the tank the fluid communication between the inflow pipe and the tank is closed due to the positioning of the heavy filling obturator and the light inverse obturator.

When the pressure from the tank, as measured at the outlet of the valve body into the tank, is greater than the inflow pressure from the pipe into the valve body, the resulting pressure causes the light inverse obturator to move away from the outlet of the valve body. Once the light inverse obturator to moves away from the outlet of the valve body, liquid flows from the tank into the first obturator, into the interior of the valve body and out through the pipe. Once the liquid level drops from the predetermined level, the float becomes slack allowing the heavy filling obturator to disengage from the valve body. Liquid then flows through the opening of the valve body, into the interior of the valve body, through the ports of the heavy filling obturator and out the inflow/outflow pipe.

The double action float valve was designed with the object of having a simple and effective valve to control the filling and discharge of tanks, using a small external float and with capacity to support high pressures free of leaks. These valves are simple, formed with wearing-free rough pieces, and can be manufactured for low and high pressures. For its simplicity, the double action float valve will work though many years without any maintenance.

DETAILED DESCRIPTION OF THE INVENTION

Figure 1:
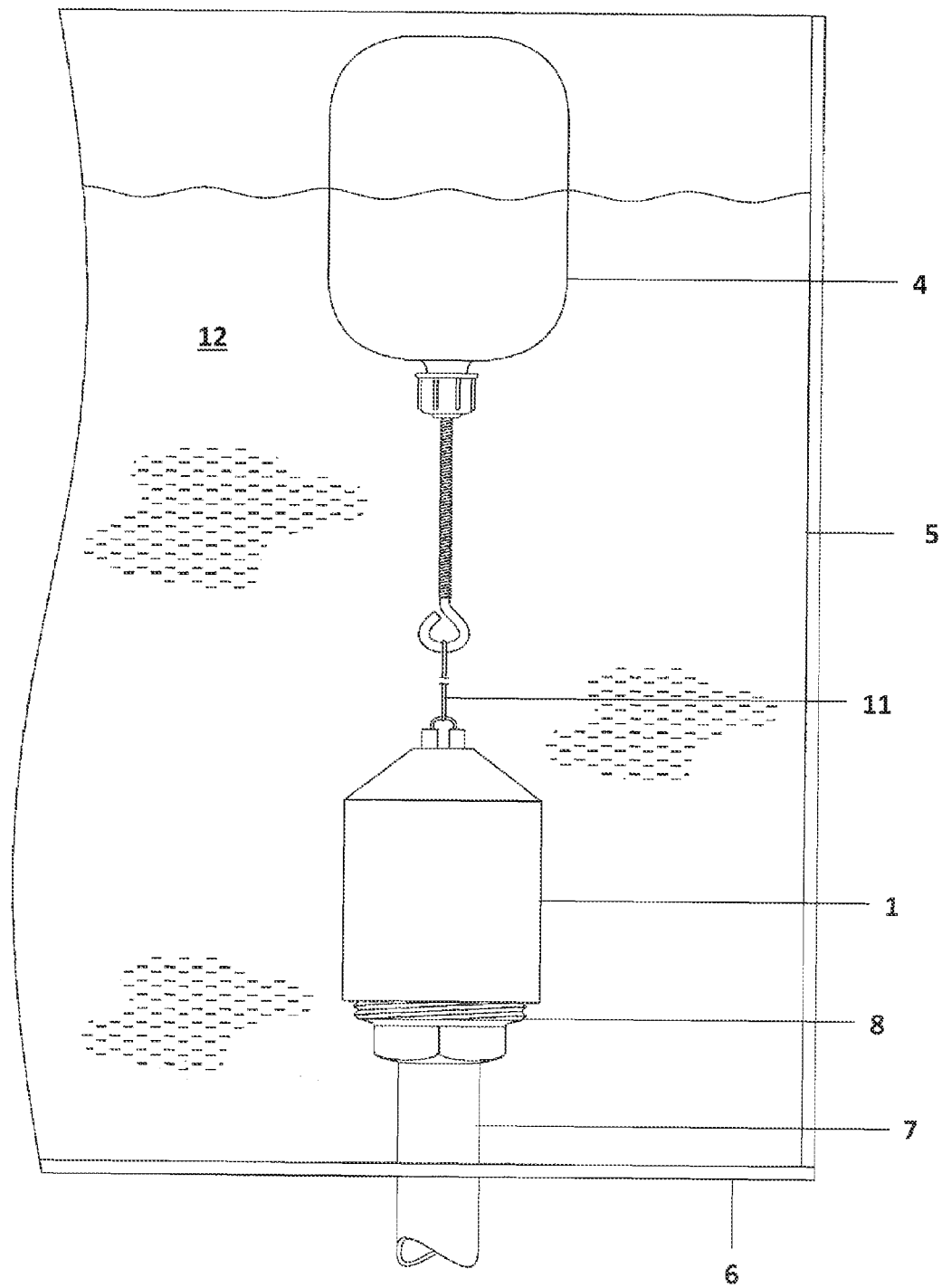
FIG. 1 is a profile view of an embodiment.
Figure 2:
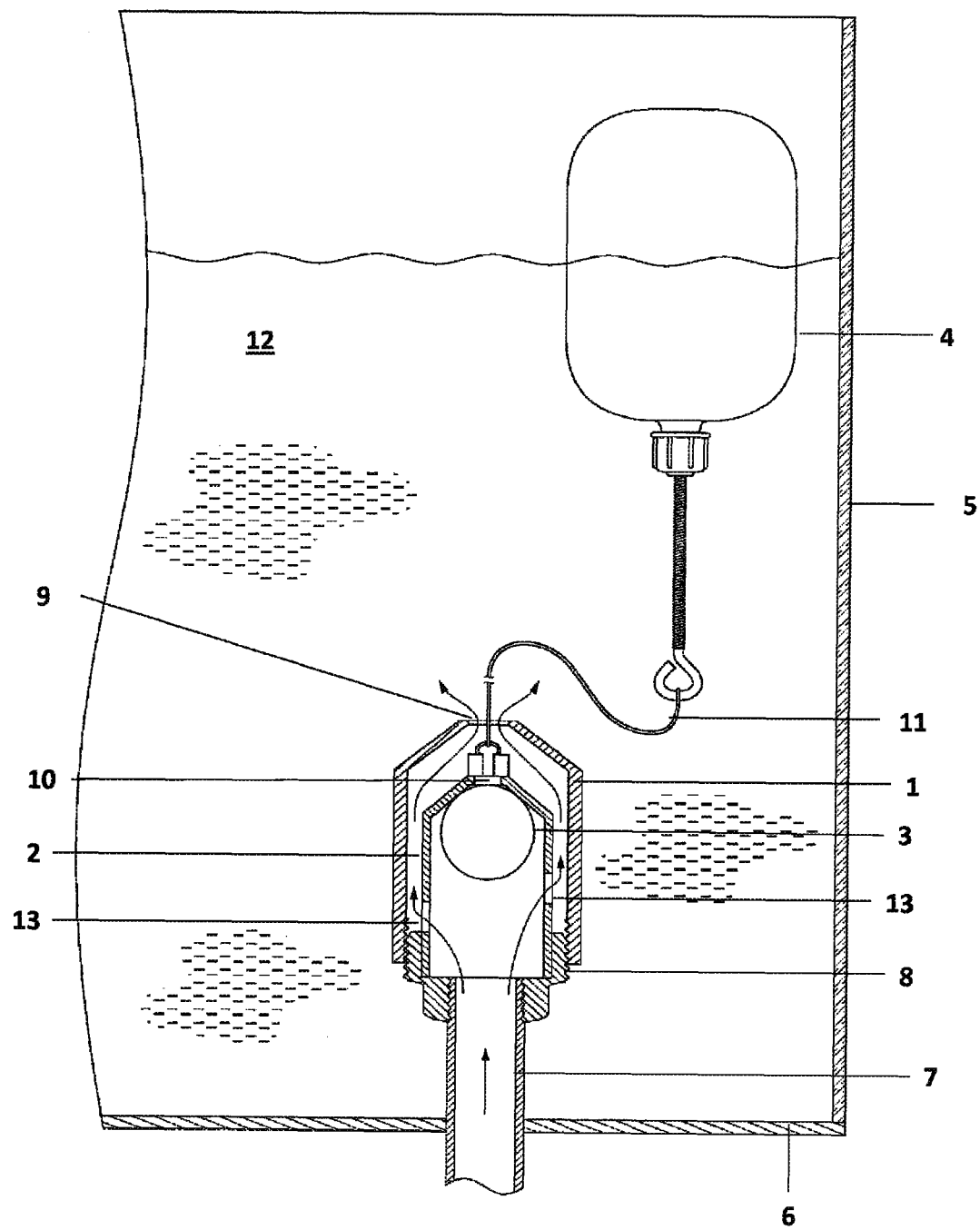
FIG. 2 is a cross-section view of an embodiment during inflow of a liquid.

Referring to FIGS. 1 and 2, the double action float valve is preferably installed at the bottom 6 of a tank 5. The valve body 1 is connected to the inflow/outflow pipe 7 with a connector 8 which may be a screw, glue, coupling, flange or any standard method of connecting a pipe to a valve body. Within the valve body 1 is a heavy filling obturator 2 and a light inverse float obturator 3. The heavy filling obturator 2 is connected to an external float 4 via linkage 11. Linkage 11 may be flexible and is strong enough to hold the heavy filling obturator 2 against the body 1 without breaking Examples of linkage depend on the weight of the heavy filling obturator 2 but such linkage may be a chain, rope, plastic line, or cable.

FIG. 2 is a cross section of the valve components found in FIG. 1. In the embodiment, valve body 1 has a cylindrical body and a cone-shaped top. Circular orifice 9 is located as the apex of the cone shaped top. Circular orifice 9 allows for fluid communication between the tank 5 and inflow/outflow pipe 7.

In the embodiment, heavy filling obturator 2 also has a cylindrical body and a cone-shaped top similar to the valve body 1 but smaller in scale. The cylindrical body of the heavy filling obturator 2 contains several fluid communication holes 13 spaced around the cylindrical body. These fluid communication holes allow for fluid communication between the interior of valve body 1 and the interior of heavy filling obturator 2. In an alternative embodiment, the cylindrical body of the heavy filling obturator 2 is made of screen. The reduction of weight will allow for a lighter external float 4 and for a less structurally demanding linkage 11. The bottom end, facing the inflow/discharge pipe, is open allowing for fluid communication between the inflow/discharge pipe and the interior of the heavy filling obturator 2. Circular orifice 10 is located at the apex of the cone shaped top of heavy filling obturator 2. Preferably, the diameter of the circular orifice 10 of heavy filling obturator 2 is smaller than the diameter of circular orifice 9 of valve body 1.

FIG. 2 shows double action float valve in operation when the tank is not full and there is a supply of fluid flowing from the inflow/outflow pipe 7 to the double action float valve. When the tank 5 is not full of fluid 12, the linkage 11 connecting the external float 4 is lax with respect to heavy filling obturator 2. As a result, heavy filling obturator 2 is sitting on the base of the valve body 1, or alternatively sitting on the connector 8. Preferably, fluid flows from the inflow/discharge pipe 7 into the interior cavity of the heavy filling obturator 2. The pressure of the inflow pushes the light inverse float obturator 3 against the circular orifice 10 of the heavy filling obturator 2, preventing flow through the circular orifice 10. As a result, fluid flows from the interior cavity of the heavy filling obturator 2 through fluid communication holes 13 into the interior cavity of the valve body 1. The fluid then flows into the space between the heavy filling obturator 2 and the valve body 1 and out through the circular orifice 9 of the valve body 1 into the tank 5.

Figure 3:
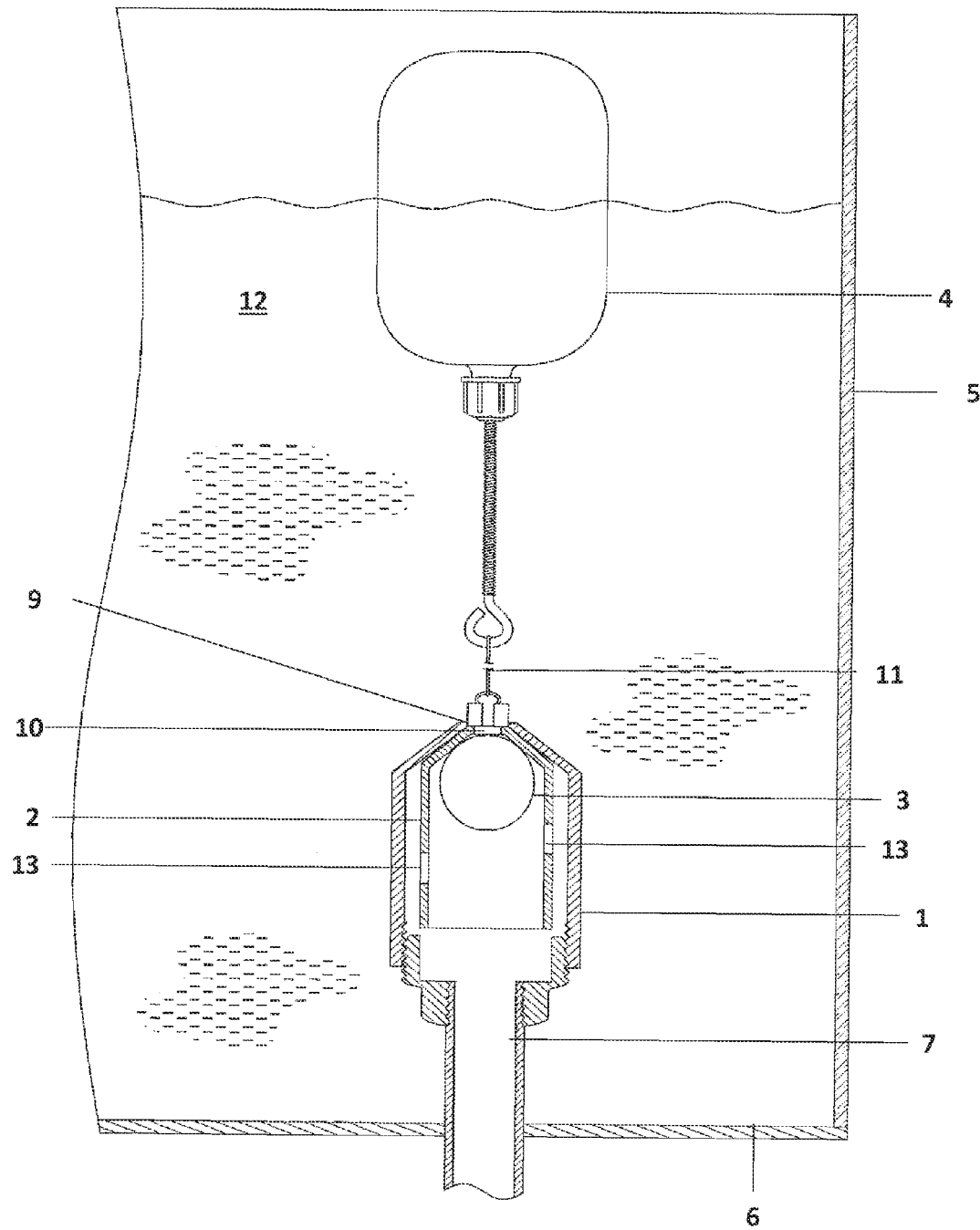
FIG. 3 is a cross-section view of an embodiment when the tank is full.

As the tank 5 fills with fluid, the external float 4 rises as the fluid level increases. As the fluid level increases, the linkage 11 becomes more taught and when the tank 5 becomes full (i.e. when the tank reaches a predetermined level based on the length of the linkage) then the external float 4 pulls the heavy filling obturator 2 against the circular orifice 9 of valve body 1 as shown in FIG. 3. When the linkage is fully taught, the heavy filling obturator 2 abuts the valve body and prevents fluid flow to and from the circular orifice 9 along a fluid communication path in the space between the heavy filling obturator 2 and the valve body 1. Due to continued fluid pressure from the inflow, light inverse float obturator 3 continues to abut circular orifice 10 of the heavy filling obturator 2 which as a result, blocks the fluid communication path through circular orifice 10. With circular orifice 10 as well as the fluid communication path in the space between the heavy filling obturator 2 and the valve body 1 blocked, fluid communication from the inflow/outflow pipe to the tank is cutoff. The light inverse float obturator 3 will remain in its position against the circular orifice 10 so long as there is pressure coming in from the inflow pipe. The higher the intake pressure the greater the force of the light inverse float obturator 3 against circular orifice 10.

Alternatively to maintaining a constant pressure inflow, a check valve may be utilized to keep fluid from flowing out of the tank 5.

To change the maximum filling level of the tank, the operator simply needs to lengthen or shorten the linkage 11 so that external float 4 pulls the linkage taught at the predetermined level.

Figure 4:
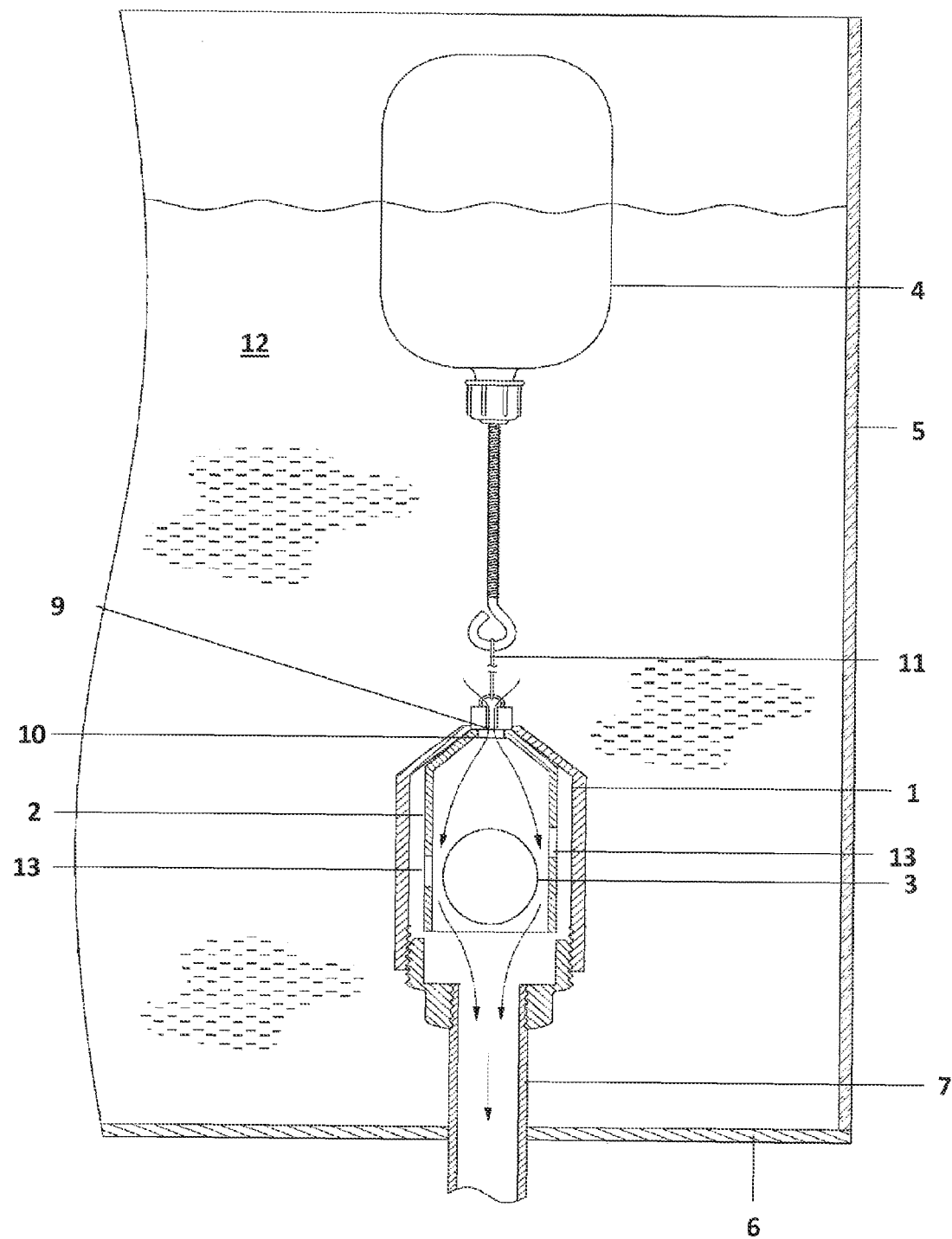
FIG. 4 is a cross-section view of an embodiment when the pressure in the tank exceeds the pressure in the inflow pipe.
Figure 5:
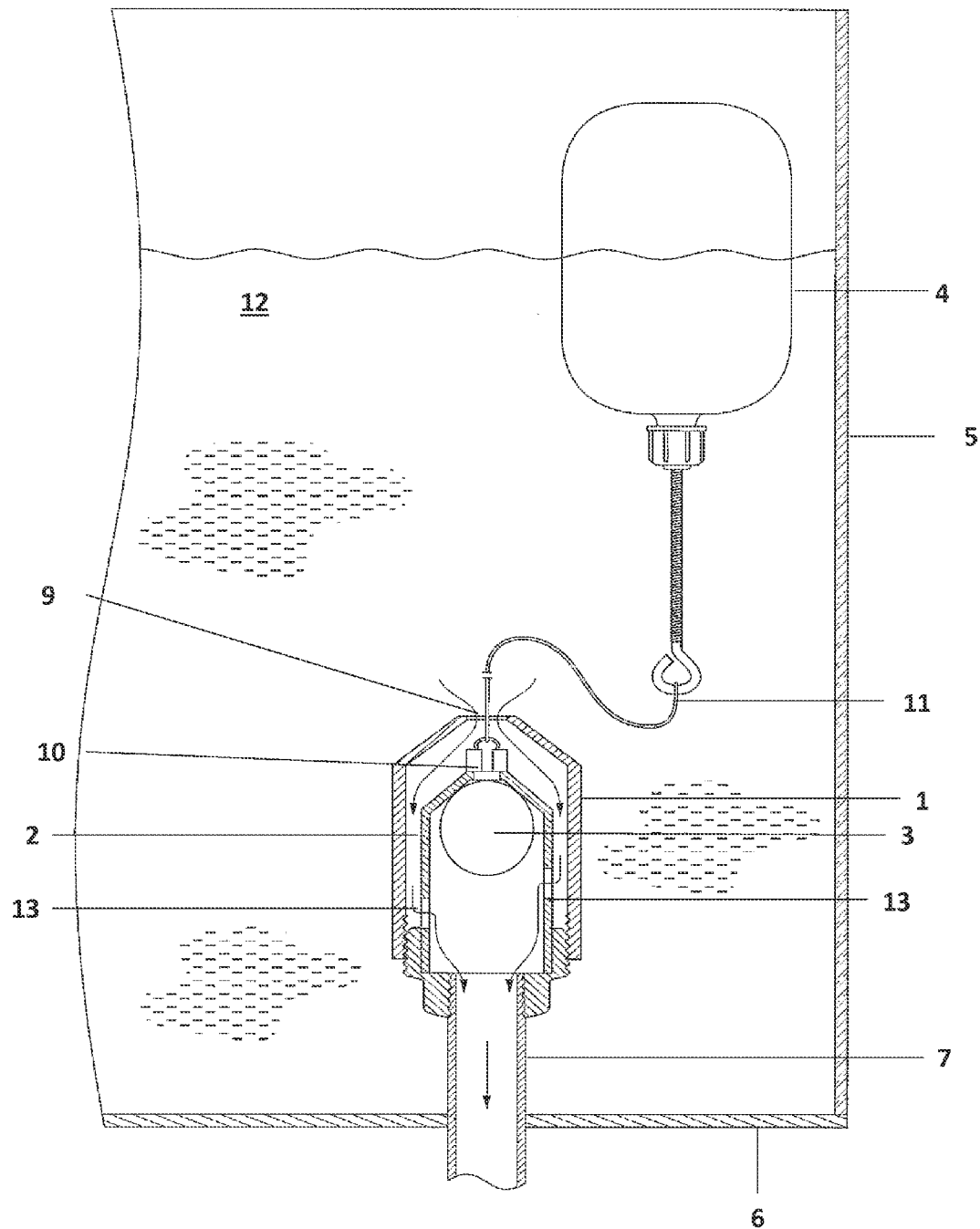
FIG. 5 is a cross-section view of an embodiment during outflow of a liquid.

Referring now to FIG. 4, if the pressure from the inflow pipe is lower than the downward fluid pressure in the tank at the level of light inverse float obturator, then the fluid pressure will push the light inverse float obturator 3 away from the circular orifice 10 into the interior cavity of the heavy filling obturator 2 and towards the inflow/outflow pipe 7 allowing fluid to enter the interior cavity of the heavy filling obturator through orifices 9, 10 and exit through inflow/outflow pipe 7. Once the level in the tank 5 is lowered enough that slack begins to form in linkage 11, the heavy filling obturator 2 will disengage from circular orifice 9 of valve body 1 as shown in FIG. 5. Once this occurs, fluid flows through the circular orifice 9 into interior cavity of valve body 1, through the fluid communication holes 13 into the interior cavity of the heavy filling obturator 2 and out the inflow/outflow pipe 7. Fluid may also flow around the heavy filling obturator 2 and out the inflow/outflow pipe 7.

Figure 6:
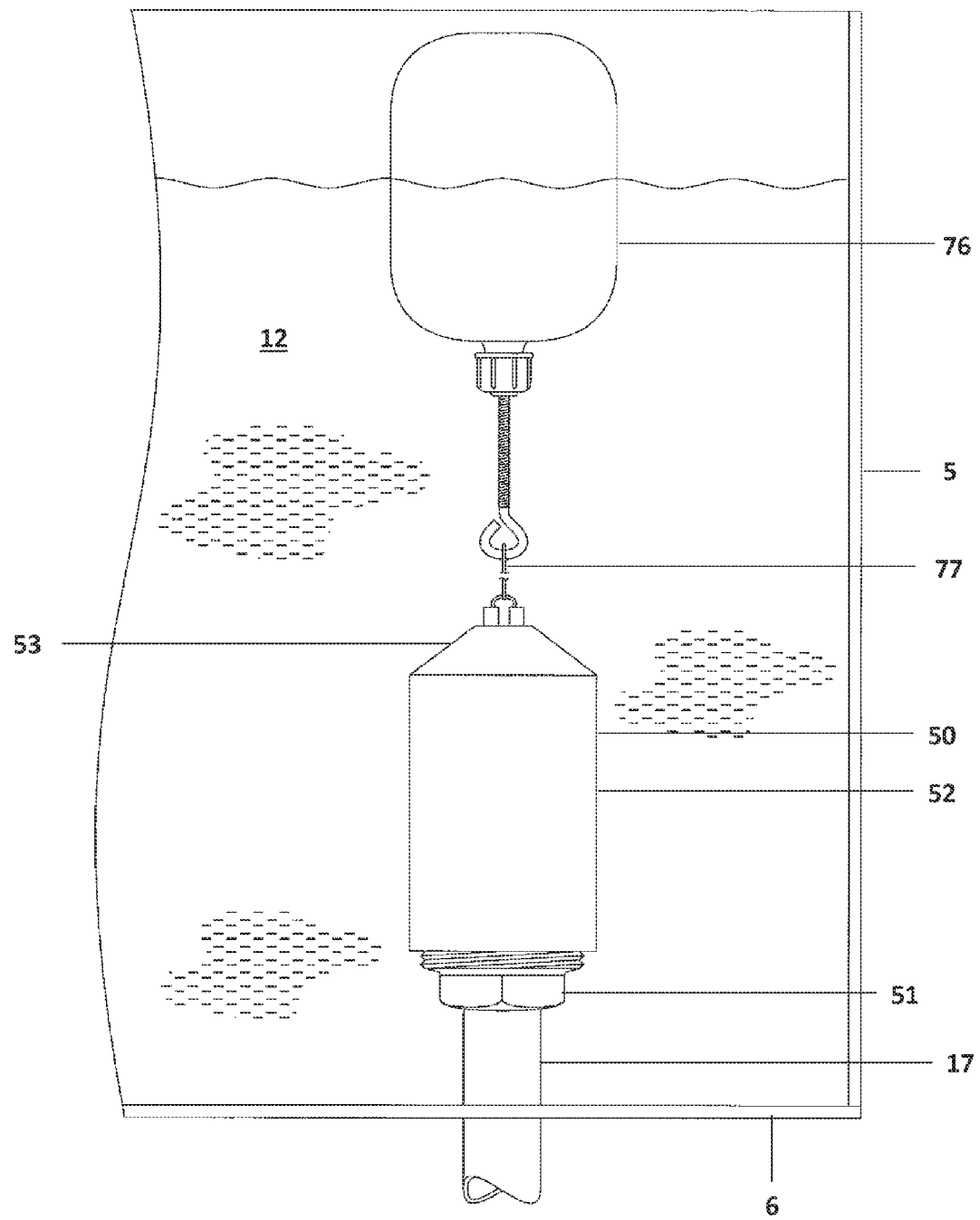
FIG. 6 is a profile view of another embodiment.
Figure 7:
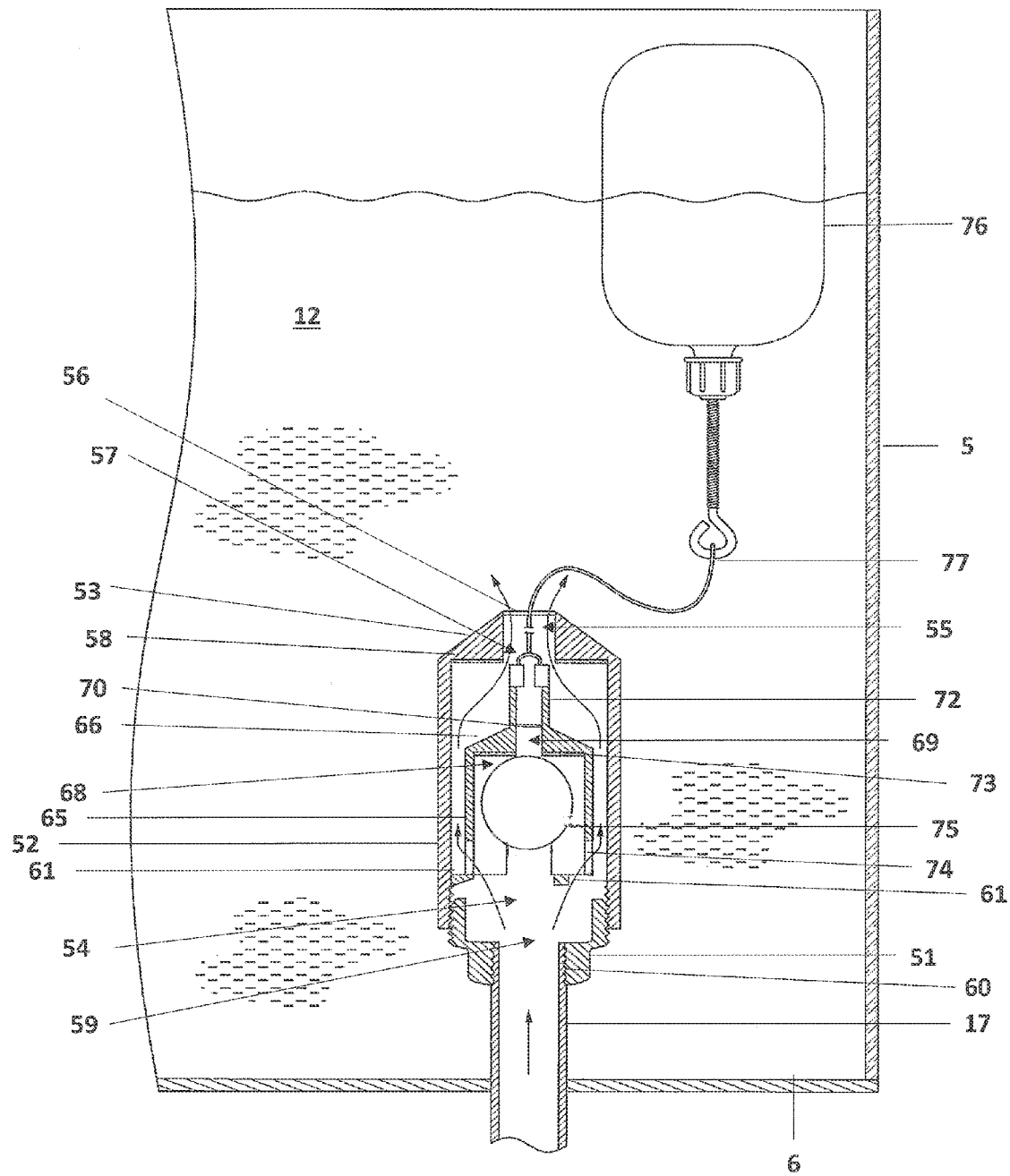
FIG. 7 is a cross-section view of another embodiment during inflow of a liquid.
Figure 8:
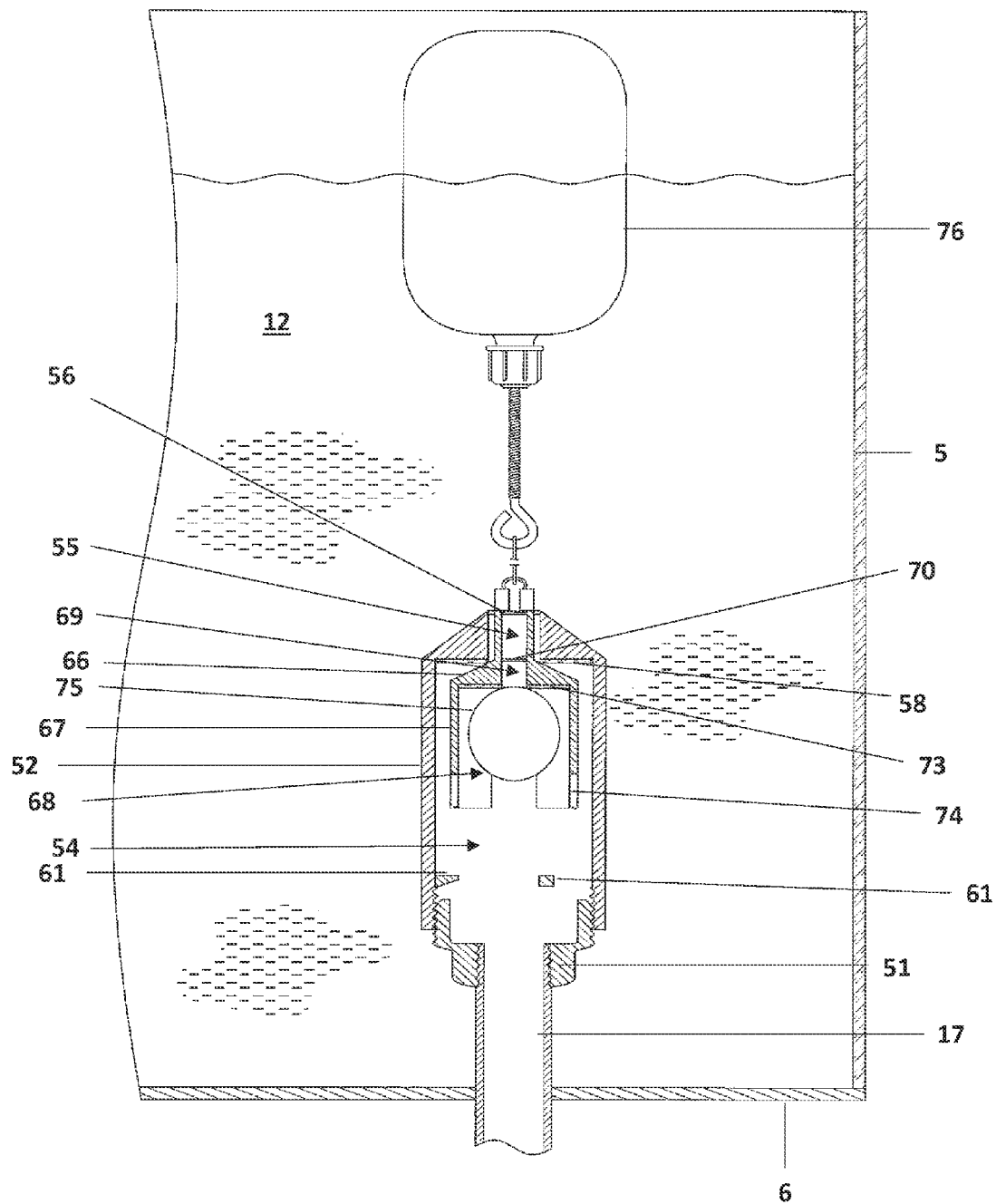
FIG. 8 is a cross-section view of another embodiment when the tank is full.

FIGS. 6-10 disclose another embodiment of the double action float valve. Referring to FIGS. 6 and 7, this embodiment comprises a valve body 50, heavy filling obturator 65, inflow/outflow pipe 17, light inverse obturator 75, and external float 76. In the illustrated embodiment, the double action float valve is installed along the bottom 6 of a tank 5.

The valve body 50 comprises a bottom 51, cylindrical sidewall 52, and a top 53 which form a valve cavity 54. The top 53 is frusto-conical in shape with a channel 55, having a filling/discharge opening 56 and a cavity opening 57, disposed through the center of the top 53. A gasket 58 is positioned along the underside of top 53 facing the valve cavity 54. In another embodiment, the top may be any other shape such as flat so long as the top contains a channel disposed there through. The gasket 58 is positioned around cavity opening 57 of channel 55. The filling/discharge opening 56 creates a fluid communication pathway between the interior of tank 5 and the valve cavity 54.

The bottom 51 contains an inflow/outflow pipe opening 59. An inflow/outflow pipe 17 is connected to the bottom 51 at the inflow/outflow pipe opening 59 by a connector 60. The connector 60 may be a screw, glue, coupling, flange or any standard method of connecting a pipe or plug to a valve body. The inflow/outflow pipe opening 59 may be located outside or inside the tank 5 depending on the physical location of the valve body 50 in reference to the tank 5. The inflow/outflow pipe opening 59 creates a fluid communication pathway between the outside of the valve body 50 and the valve cavity 54.

Posts 61 extend from the interior surface of sidewall 52 into the valve cavity 54. Posts 61 are positioned with their top surfaces above the inflow/outflow pipe opening 59. Posts 61 generally have the same height but it is not required.

Within the valve body 50 is a heavy filling obturator 65 which comprises a top 66 and a cylindrical sidewall 67 which form an obturator cavity 68. The top 66 is frusto-conical in shape with a channel 69, having a tank opening 70 and a cavity opening 71, disposed through the center of the top 66. In another embodiment, the top may be any other shape such as flat so long as the top contains a channel disposed there through. Connector post supports 72 extend from the top 66, proximal to the tank opening 70, in an opposing direction from the obturator cavity 68. Connector post supports 72 are attached to the top 66 and not connected to each other which permits fluid to pass between each respective connector post support 72. The connector post supports 72 are positioned sufficiently close together to fit through the channel 55 of the valve body 50. The tank opening 70 has a smaller diameter than the filling/discharge opening 56 of valve body 50.

A gasket 73 is positioned along the underside of top 66 facing the cavity 68. The gasket 73 is positioned around cavity opening 71 (as identified in FIG. 9) of channel 69. The cylindrical sidewall 67 (as identified in FIG. 8) has cutout portions 74 positioned along the bottom of the cylindrical sidewall 67. Cutout portions 74 are rectangular shaped cutouts but may be other shapes. The bottom end of the heavy filling obturator 65, facing the inflow/outflow pipe opening 59, is open allowing for fluid communication between the inflow/outflow pipe 17 and the obturator cavity 68. A light inverse obturator 75 is positioned within the obturator cavity 68. The light inverse obturator 75 is spherical in shape with a sufficient diameter to block the cavity opening 71 of the heavy filling obturator 65. The light inverse obturator 75 is less dense than the fluid utilized in the tank.

The heavy filling obturator 65 is connected to an external float 76 via linkage 77. Linkage 77 is connected to the connector supports 72 of the heavy filling obturator 65. Linkage 77 may be flexible but is strong enough to hold the heavy filling obturator 65 against the valve body 50 without breaking Examples of linkage depend on the weight of the heavy filling obturator 65 but such linkage may be a chain, rope, plastic line, or cable.

FIG. 7 shows an embodiment double action float valve in operation when the tank is not full and there is a supply of fluid flowing from the inflow/discharge pipe to the double action float valve. When the tank 5 is not full of fluid 12, the linkage 77 connecting the external float 76 is lax with respect to heavy filling obturator 65. As a result, heavy filling obturator 65 is sitting on the posts 61 of valve body 50. In another embodiment, the heavy filling obturator 65 rests on the bottom 51 of the valve body 50 instead of posts 61. Fluid flows from the inflow/discharge pipe 17 into the cavity 68 of the heavy filling obturator 65 and the valve cavity 54 of the valve body 50. The pressure of the inflow pushes the light inverse float obturator 75 away from the inflow/outflow pipe opening 59 and towards the gasket 73 positioned on the underside of top 66 of the heavy filling obturator 65. The cutout portions 74 reduce flow restrictions within the valve body 50 but are small enough to prevent the light inverse obturator 75 from moving completely outside the obturator cavity 68. The fluid then flows in the space between the heavy filling obturator 65 and the valve body 50, through the channel 55 and out the filling/discharge opening 56 into the tank 5.

As the tank 5 fills with fluid, the external float 76 rises as the fluid level increases. As the fluid level increases, the linkage 77 becomes more taught and when the tank 5 becomes full (i.e. when the tank reaches a predetermined level based on the length of the linkage) then the external float 76 pulls the heavy filling obturator 65 against the gasket 58 positioned on the underside of top 53 of the valve body 50 as shown in FIG. 3. When the linkage is fully taught, the connector supports 72 extend through the channel 55 of the valve body 50. The top 66 of the heavy filling obturator 65 abuts the valve body 50, through contact with the gasket 58, and prevents fluid flow to and from the channel 55 along a fluid communication path in the space between the heavy filling obturator 65 and the valve body 50.

Due to continued fluid pressure from the inflow, light inverse float obturator 75 abuts the gasket 73 positioned on the underside of the top 66 of the heavy filling obturator 65 which, as a result, blocks the fluid communication path between the cavity 68 and the channel 69. In this configuration, no fluid is able to enter either channel 55, 69 thus blocking the fluid communication path between the inflow/outflow pipe 17 and the tank 5. The light inverse float obturator 75 will remain in its position blocking the cavity opening 71 to the channel 69 so long as the pressure coming in from the inflow pipe 17 is greater than the pressure in the tank 5 as measured in the channel 69. The higher the intake pressure the greater the force of the light inverse float obturator 75 against the gasket 73.

To change the maximum level of fluid within the tank 5, the operator simply needs to lengthen or shorten the linkage 77 so that external float 76 pulls the linkage taught at the predetermined level.

Figure 9:
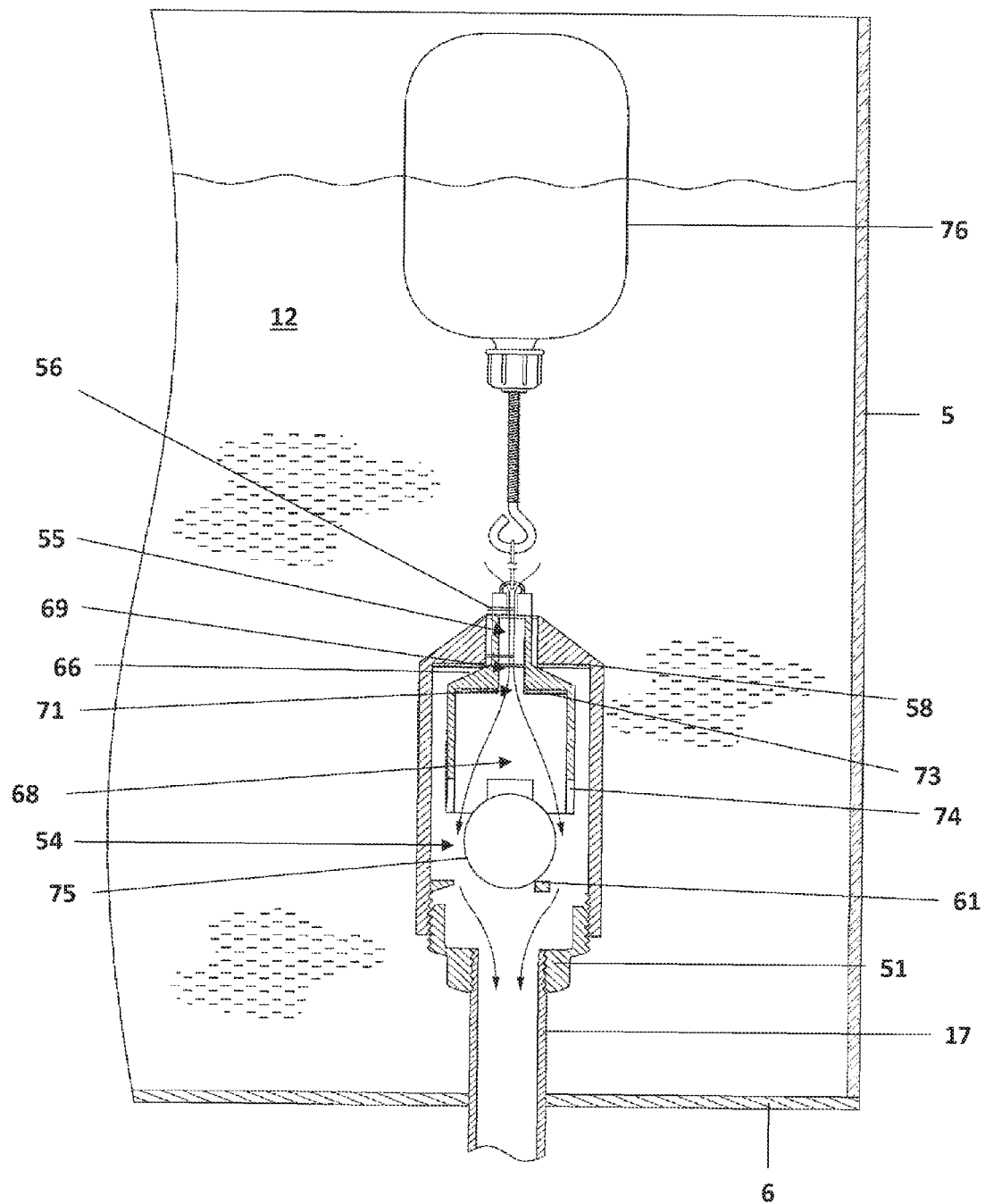
FIG. 9 is a cross-section view of another embodiment when the pressure in the tank exceeds the pressure in the inflow pipe.
Figure 10:
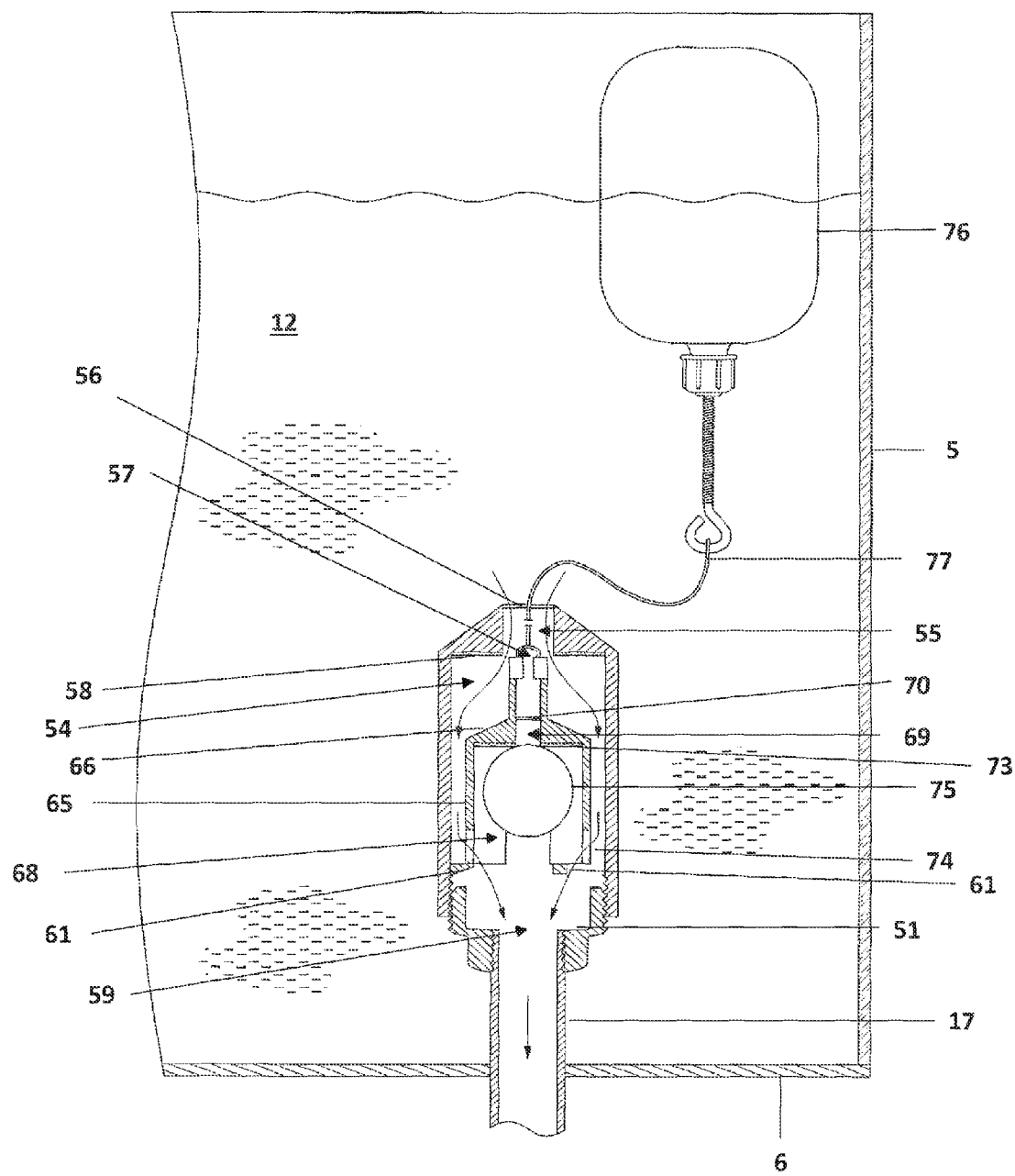
FIG. 10 is a cross-section view of another embodiment during outflow of a liquid.

Referring now to FIG. 9, if the pressure from the inflow pipe is lower than the fluid pressure in the tank 5 at the level of light inverse float obturator 75, then the fluid pressure will push the light inverse float obturator 75 away from the gasket 73 and the cavity opening 71. Fluid then flows from the tank 5, via tank opening 70 and channel 69, out the cavity opening 71 into the cavity 68 of the heavy filling obturator 65. The fluid flows around the light inverse obturator 75, into the valve cavity 54, through the inflow/outflow pipe opening 59 and out the inflow/outflow pipe 17. Once the level in the tank 5 is lowered enough that slack begins to form in linkage 77, the heavy filling obturator 65 disengages from the gasket 58 of the valve body 50 as shown in FIG. 10. Once this occurs, fluid flows from the tank 5, via filling/discharge opening 56 and channel 55, out the cavity opening 57, into the valve cavity 54, around the heavy filling obturator 65, into the inflow/outflow pipe opening 59 and out the inflow/outflow pipe 17.

The double action float valve can be manufactured with metallic or non-metallic materials, such as plastic, resins, etc. It can handle any type of liquids, corrosive and non-corrosive. The double action float valve may be applied to pipes of virtually all sizes. The double action float valve is to be preferably installed at the bottom of the tank. However, it is anticipated that it can be installed at various levels. The double action float valve is light, simple, and made with a small number of pieces, which makes it economic and unlikely to fail.

The double action float valve has numerous applications from city water systems utilizing water towers for peak demand to home use. The design of the double action float valve allows for use with a water supply that has an elevation higher than the tank or for use with a water supply that has a pumping station.

The present invention is described above in terms of two illustrative embodiments of a specifically-described double action float valve. Those skilled in the art will recognize that alternative constructions of such a device can be used in carrying out the present invention. Aspects such as the shape of the circular orifices, shape of the valve body, heavy filling obturator, and light inverse float obturator are changeable without affecting the principles of the invention. Other aspects, features, and advantages of the present invention may be obtained from a study of this disclosure and the drawings, along with the appended claims.

I claim:

1. A float valve comprising:
   a valve body defining a valve cavity having a first opening allowing fluid communication between a fluid inlet and said valve cavity and a second opening allowing fluid communication between the interior of a tank capable of storing a fluid and said valve cavity;
   a first obturator having a density greater than the density of said fluid, positioned within said valve body;
   said first obturator having a first opening;
   a second obturator having a density which is less than said density of said fluid; and
   a float connected to said first obturator.

2. The float valve of claim 1 wherein said first obturator can move between first position wherein said first obturator at least partially blocks said second opening of said valve body and a second position wherein said first obturator does not obstruct said second opening of said valve body.

3. The float valve of claim 2 wherein the vertical level of said float causes the first obturator to move between said first position and said second position.

4. The float valve of claim 2 wherein said second obturator moves between a first position wherein said second obturator blocks said first opening of said first obturator and a second position wherein said second obturator does not obstruct said first opening of said first obturator.

5. The float valve of claim 4 wherein fluid flow to and from said second opening of said valve body is blocked when said first obturator is in said first position and said second obturator is in said first position.

6. The float valve of claim 1 wherein said first obturator moves between a first position wherein said first obturator blocks a first fluid communication path and a second position wherein said first fluid communication path is unblocked, said first fluid communication path being the path wherein fluid passes to and from said second opening of said valve body through a space between said first obturator and said valve body.

7. The float valve of claim 6 wherein said second obturator moves between a first position wherein said second obturator blocks a second fluid communication path and a second position wherein said second fluid communication is unblocked, said second fluid communication path being the path through said first obturator.

8. The float valve of claim 1 wherein said float is connected to said first obturator through a mechanical linkage disposed through said second opening of said valve body.

9. The float valve of claim 8 wherein at least a portion of said mechanical linkage is flexible.

10. The float valve of claim 9 wherein said flexible mechanical linkage is adjustable.

11. The float valve of claim 1 wherein said valve body further comprises a frusto-conical section and wherein said second opening is positioned at the apex of said frusto-conical section.

12. The float valve of claim 11 wherein said first obturator further comprises a frusto-conical section wherein said second opening is positioned at the apex of said frusto-conical section.

* * * * *